United States Patent
Khan

(10) Patent No.: US 6,807,487 B2
(45) Date of Patent: Oct. 19, 2004

(54) MAPPING PERMEABLE RESERVOIR FORMATIONS BY MEASURING THE ELASTIC NONLINEAR INTERACTIONS OF A SEISMIC WAVE AS IT PROPAGATES THROUGH THE RESERVOIR ROCK MATRIX AND ITS PORE FLUIDS

(75) Inventor: Tawassul Ali Khan, Cypress, TX (US)

(73) Assignee: Nonlinear Seismic Imaging, Inc., Cypress, TX (US)

( * ) Notice: Subject to any disclaimer, the term of this patent is extended or adjusted under 35 U.S.C. 154(b) by 0 days.

(21) Appl. No.: 09/853,190

(22) Filed: May 11, 2001

(65) Prior Publication Data

US 2002/0188407 A1 Dec. 12, 2002

(51) Int. Cl.⁷ ................................................ G01V 1/00
(52) U.S. Cl. .................................... 702/16; 367/905
(58) Field of Search .............................. 702/11, 13, 16

(56) References Cited

U.S. PATENT DOCUMENTS

| | | | | |
|---|---|---|---|---|
| 4,964,101 A | * | 10/1990 | Liu et al. ...................... 367/31 |
| 5,074,149 A | * | 12/1991 | Stearns ......................... 73/579 |
| 6,009,043 A | * | 12/1999 | Chon et al. ................... 367/75 |
| 6,175,536 B1 | * | 1/2001 | Khan ............................ 367/32 |

* cited by examiner

Primary Examiner—John Barlow
Assistant Examiner—Toan M. Le
(74) Attorney, Agent, or Firm—Tawassul A. Khan; Sofia K. McGuire; Nonlinear Seismic Imaging, Inc.

(57) ABSTRACT

Permeability is one of the most important factors in influencing the commercial viability of a hydrocarbon reservoir. So far, permeability cannot be measured directly in-situ in reservoir formations. This invention relates to the field of estimating in-situ permeability of the reservoir rock formations. The measurements can be made across two wells or in a single well. Due to the morphology of their pore interconnections and the pore fluids in the rock, permeable rocks are elastically nonlinear. In a permeable rock, which is elastically nonlinear, the interactions between two elastic waves can be used in a unique way to map its physical properties. In this invention, the interaction of an elastic wave generated within the permeable rock with an externally generated seismic signal is used to determine the bulk tortuosity and bulk permeability of a reservoir rock formation.

7 Claims, 7 Drawing Sheets

MAPPING PERMEABLE RESERVOIR FORMATIONS BY MEASURING THE ELASTIC NONLINEAR INTERACTIONS OF A SEISMIC WAVE AS IT PROPAGATES THROUGH THE RESERVOIR ROCK MATRIX AND ITS PORE FLUIDS

BACKGROUND OF THE INVENTION

1. Field of the Invention

This invention relates to the field of estimating in-situ permeability of the reservoir rocks. More specifically, the invention is related to a method of determining the dynamic elastic nonlinear interaction between the Fast Compressional Seismic Wave that travels through the rock matrix and a liquid/solid coupled slower Compressional Seismic Wave that travels through the interconnected fluid-filled pores. The presence of this slower Compressional Wave in a hydrocarbon reservoir formation is a strong indicator of the formation's bulk permeability. In this invention, the slower Compressional Wave that is generated, due to the solid/liquid coupling as the Fast Compressional Wave propagates through a permeable rock formation, is identified as "Drag-Wave." This Drag-Wave travels at the pore fluid compressional velocity but over a longer distance along the tortuous path of the interconnected pores. The elastic nonlinear interaction between the Fast Compressional Wave and the Drag-Wave, as they propagate through a reservoir formation, generates summed and differenced frequencies of the two waves. From this information the Drag-Wave velocity can be calculated. From the Drag-Wave velocity we can calculate the bulk tortuosity of the formation. Permeability that is dependent on the pore size and the tortuosity of the pores can be determined, once the tortuosity is known.

2. Description of the Related Art

Permeability is often the most important factor in influencing the commercial viability of a hydrocarbon reservoir. So far, permeability cannot be measured directly in-situ in reservoir formations. Downhole tools that measure permeability in a borehole quite often provide ambiguous results, and these results are confined to the immediate vicinity of the wellbore. Measurement or estimation of permeability in carbonate reservoir rocks is even more difficult, since carbonates are more heterogeneous compared to sandstones.

A new seismic method that can estimate the bulk permeability of the reservoir formations between the wells will be extremely useful for implementing an efficient production program for a hydrocarbon-producing field that will optimize the economics of the hydrocarbon recovery.

Biot (1956) proposed a comprehensive theory that explained many important features of the seismic wave propagation in fluid-saturated porous media. One of the important contributions of his theory is the prediction of a Slow Compressional Wave with a speed lower than that of the rock matrix or the pore fluid. The Slow-Wave involves a coupled motion between the fluid and the solid frame. The Slow-Wave's velocity and attenuation depend on the morphology of the pore space and the pore interconnections, which also determine the fluid transport properties such as permeability. The detection of the presence of the Slow-Wave in a reservoir formation between two wells is a strong indicator that the formation is permeable.

The Slow-Wave has been successfully measured under laboratory conditions using samples of glass beads and sand stone samples from typical reservoir formations (Berea and Massillon). Considerable effort has been made to detect the Slow-Wave in in-situ sedimentary rocks. So far this effort has not been very successful.

Since information related to in-situ rock permeability of the reservoir formations is extremely important for developing an accurate reservoir simulation model of its flow units, a new method of estimating the permeability of in-situ reservoir formations has been developed. In this invention, we determine the existence and the properties of the Slow-Wave for estimating the bulk tortuosity and permeability of the in-situ reservoir formations.

SUMMARY OF THE INVENTION

This invention introduces a new method of mapping reservoir flow units by identifying the in-situ permeability of the reservoir formations between the existing wells. To economically produce hydrocarbons from a reservoir, the reservoir rocks have to be porous so that the fluids can be stored in the pores. The pores have to be connected so that the reservoir fluids can flow between the pores. The capacity of transmitting a fluid in a rock depends on the size and shape of the pores, size and shape of the interconnections and their extent, and is known as permeability.

When a pressure wave travels through a rock, the rock matrix and pore fluids are simultaneously compressed. The velocity of the Compressional Wave in the rock matrix is related to the mineral frame and the cementation between the grains, while the velocity of the slower component of the Compressional Wave that travels through the interconnected fluid path is determined by the physical properties of the pore fluids and the tortuosity of the connected pores in the rock.

In the published literature, the Compressional Wave that travels through the fluids in the interconnected pores is identified as Slow-Wave. Slow-Wave has been measured under laboratory conditions in samples of glass beads and different porous and permeable sandstones. The Slow-Wave travels at the fluid compressional velocity but over a longer distance along the tortuous interconnected pores between the two ends of the reservoir formation, which is being measured.

The Slow-Wave is diffusive and highly attenuated. For this reason, it has been difficult to measure the Slow-Wave in-situ in the reservoir rocks. The measurements related to the Slow-Wave provide a unique opportunity to determine the reservoir rock properties such as permeability and tortuosity, which affect the flow mechanism of the reservoir fluids. Since Slow-Wave cannot be measured due to its high attenuation in-situ in the sedimentary rocks of the reservoir, a new method of measuring Slow-Wave has been developed and described in this Patent.

Permeable rocks are elastically nonlinear due to: a) their morphology; b) the microstructures of their pores; c) the pore interconnections; and d) pore fluids. In a permeable rock that is elastically nonlinear, the interactions between two elastic waves can be used in a unique way to map its physical properties. An elastic wave generated within a rock can be made to interfere with an externally generated seismic signal, and their elastic nonlinear interaction can be measured to determine the bulk tortuosity and permeability of a reservoir formation.

When the Primary external signal is a sinusoidal wave of a predetermined frequency and time duration, it creates a moving wave of compressional and rarefaction fronts that are repetitive and travel one wavelength apart. Each compressional front is separated from the next compressional front by a wavelength. Due to the physical coupling between the rock matrix and the fluid-filled pores, a Drag-Wave is generated as the Primary Sinusoidal Wave propagates through the rock matrix. The Drag-Wave propagates through the fluid-filled interconnected pores at the same velocity as the Slow-Wave. This velocity depends on the pore fluid properties and the tortuous path of the pore interconnections.

The Primary Sinusoidal Wave and the Drag-Wave propagate through the rock simultaneously and they elastically interact with each other. Due to the elastic nonlinearity of the permeable rock, the interaction between these two waves can be detected and measured as the elastic nonlinear interaction of the high-frequency Primary-Wave and the low-frequency Drag-Wave.

When two elastically linear seismic waves travel together in a subsurface formation, the principle of superposition holds and there is no interaction between the two waves. However, when they travel through a formation that is elastically nonlinear, then a nonlinear interaction between the two elastic waves occurs, and summed and differenced frequencies are generated.

In a permeable subsurface formation that is nonlinear, the interaction between the high-frequency Primary-Wave and the low-frequency Drag-Wave generates the summed and differenced frequencies of the two seismic signals. These summed and differenced frequencies appear as the side lobes of the Primary-Wave spectrum, and can be measured. The measured values provide us with information that directly translates into the frequency content of the Drag-Wave. Measurement of the Drag-Wave frequency and its relative amplitude is directly related to the bulk tortuosity and bulk permeability of the reservoir formation.

Since the Drag-Wave is generated by the liquid/solid coupled motion of the Primary-Wave, its frequency is determined by the Primary-Wave frequency, the velocity of the Primary-Wave, and the velocity of the Drag-Wave. The velocity of the Primary-Wave can be determined by the first seismic arrivals of the crosswell seismic data; it is a standard practice and well known in the current art. The frequency of the Primary-Wave is the frequency of the input signal transmitted by the downhole source, in this case a predetermined sinusoidal signal. The frequency of the Drag-Wave can be measured from the display of the side lobes of the frequency spectrum, since they result from summing and differencing of the Primary-Wave frequency and the Drag-Wave frequency. The velocity of the Drag-Wave can be calculated by:

$$F\text{drag}/F = V\text{drag}/(V - V\text{drag})$$

where Fdrag is the frequency of the Drag-Wave; F is the frequency of the Primary-Wave; Vdrag is the velocity of the Drag-Wave; and V is the velocity of the Primary-Wave.

The Drag-Wave velocity and the Slow-Wave velocity are the same, since the Drag-Wave is a form of Slow-Wave that is generated as the Primary-Wave propagates through a reservoir formation, due to the coupling between the rock matrix and the pore fluids. For this invention, the Drag-Wave nomenclature has been used since there is some confusion with the true meaning of "Slow-Wave" in the way it has been used by different authors in the published literature.

Once the Drag-Wave velocity is known, the bulk tortuosity of the reservoir formation between two wells can be calculated as:

$$V\text{drag} = V\text{fluid}/\sqrt{T}$$

where T is Tortuosity; and Vfluid is the compressional velocity in the pore fluid. Tortuosity is a measure of the sinuosity of the pores. Once the Tortuosity of the permeable formation has been determined, the Sinuosity of the interconnected pores can be calculated. Velocity of the pore fluids in the reservoir rocks can be measured by using the well-known Time-Average equation developed by Wyllie et al (1958). This equation is often used to relate the velocity of the reservoir formation and the porosity.

1/Formation velocity=Porosity/Pore Fluid Velocity+(1−Porosity)/Velocity of Rock Matrix.

Different wireline well logs are run as a normal routine, to identify the rocks, evaluate the reservoir formations, and to measure their petrophysical and elastic properties. The reservoir formation velocity is routinely measured using wireline Sonic Logs. In addition to the well logs coring of the reservoir formations is carried out for detailed analysis. The core of the reservoir rock is the only direct source of data for a particular reservoir. Oil and Gas exploration industry uses well logs and core evaluation as a general practice for reservoir characterization. Reservoir characterization instruments and coring tools are readily available in the industry to measure the elastic and petrophysical properties of the reservoir rocks and to obtain samples of the reservoir fluids.

Core Measurements provide an accurate value of the velocity of the rock matrix and the porosity of the reservoir rock. The industry has the equipment and knowledge for the measurements of the acoustic velocity of a core sample under a wide range of pore and confining pressures. Measurements can be made either with dry or saturated core samples. The texture of the core is analyzed to determine the train size, shape, and distribution. Porosity and crack density is measured. Once the reservoir formation velocity is known from the Sonic Log, and Velocity of the rock Matrix and Porosity is measured using the core sample, the velocity of the Pore Fluid can be calculated, using the Time-Average equation described above. In the case, where the samples of the reservoir fluids are available, direct measurements of the reservoir fluid properties can be made. The Modulation Formation Tester (Schlumberger) tool provides formation and hydrostatic pressure, temperature and fluid resistivity while fluid sample is being acquired. There are similar tools available from other service companies. The recovery of in situ pore fluid provides samples, which can be used to analyze the pore fluid properties. The velocity of the pore fluid can be measured as a part of the analysis. The velocity derived from in situ pore fluid measurements can be used to calibrate the velocity derived using Time-Average equation.

The Tortuosity 'T' equals to:

$$T = (La/L)^2$$

where La is the actual (sinuous) length of the interconnected pores in a formation of length L.

So we can simplify the equation for Vdrag:

$$V\text{drag} = V\text{fluid}(L/La)$$

Basically, this equation says that the Drag-Wave travels at the fluid compressional velocity, but over the longer distance along the tortuous interconnected pores between two end points of a reservoir formation (between two wells).

Scheidegger (1960) showed that permeability of a solid that has porosity 'Φ' containing sinuous pores of constant radius 'r' and tortuosity 'T' is given by:

$$K = \Phi r^2 / 8T$$

where 'K' is the permeability of the rock. Once the bulk tortuosity of a reservoir formation has been determined, the bulk permeability can be calculated. The permeability is strongly dependent on pore size, and is also a function of the rock tortuosity.

The amplitude of the summed and differenced frequencies of the two seismic waves, which are created due to the nonlinear elastic interaction in a permeable rock, is directly related to the product of the amplitudes of the two waves. So, the relative amplitude of the frequency side lobes created due to the interaction between the Primary-Wave and the Drag-Wave gives us a measure of the relative amplitude of the Drag-Wave, since the Primary-Wave input signal is known. Knowing the relative amplitude of the Drag-Wave between different well pairs, and by keeping the input signal at a constant level, we are able to determine a qualitative measure of the rock properties of the reservoir formation between one well pair to the next well pair. The amplitude of the Drag-Wave is related to the transfer of energy from the Compressional Wave to the pore fluids. This transfer of energy is more efficient if the pores are flat rather than circular. The amplitude of the Drag-Wave is also related to the width and size of the interconnections between the pores; it is a qualitative measure of the bulk permeability of the rock formation between the two wells.

The other useful information that is derived from the spectral analysis of the received and recorded signal is the presence and the relative amplitudes of the second and third harmonics of the fundamental frequency. The second and third harmonics are indicative of the elastic nonlinearity of the rock formation between the two wells. Rocks are elastically nonlinear due to structural defects in their matrix or frame caused by micro-fracturing, porosity, permeability and fluid saturation. The presence of harmonics, along with the frequency side lobes created by the presence of Drag-Wave, is a further confirmation of permeability of a rock formation between the two wells.

Based on experience in operating and producing from a particular reservoir, a geologic model of the reservoir is already in place. This geologic model can be calibrated against the new information that is added in the form of relative amplitudes of the Drag-Wave and the relative nonlinearity of the reservoir rock between different well pairs.

This invention outlines a new concept of measuring in-situ the velocity of the Slow Compressional Wave (Drag-Wave), and the bulk tortuosity of a permeable reservoir formation. Absence of the Drag-Wave between any two sampled depths in the source and receiver wells indicates that between those two levels there is no straight-line permeable connection between the two wells. The field implementation of this invention is relatively easy and requires standard crosswell seismic equipment, which is available and known in the industry. It is a standard practice to use a downhole source in one well and receiver arrays in adjacent wells. The current standard equipment can easily be adapted to transmit mono-frequency signals at discrete pre-selected frequencies and recordings made using multiple downhole receivers with independent outputs. Anyone familiar with crosswell seismic can plan and record the data needed to provide complete vertical coverage of the reservoir formations of interest to map permeability connections between the wells.

The crosswell seismic methods are well known in the industry, have been practiced for over ten years, and do not require a lot of description.

DESCRIPTION OF THE PREFERRED EMBODIMENT

Figure 1:
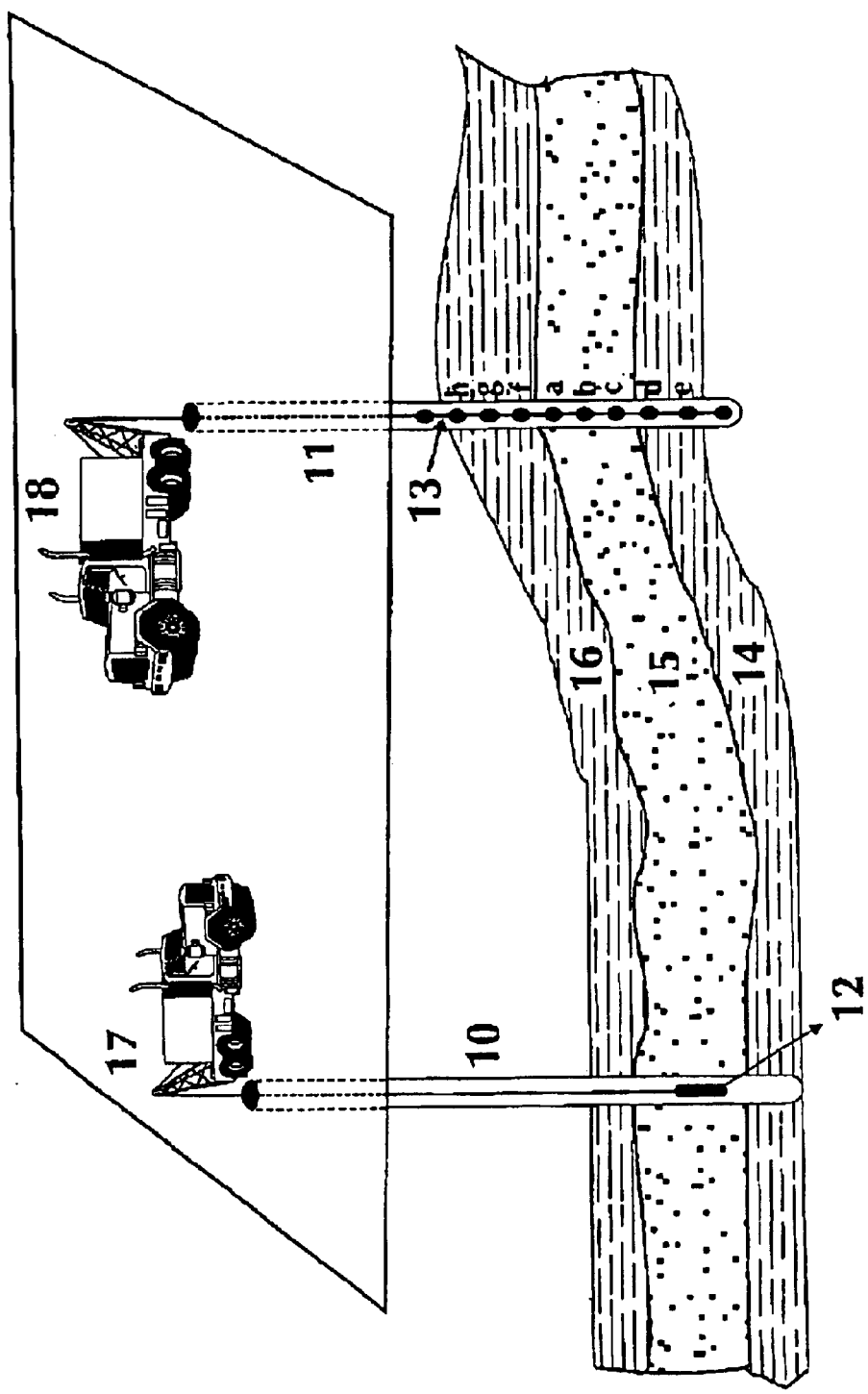
FIG. 1 is a simplified schematic, taken partly in cross section, to illustrate the field data acquisition for the invention.

In the drawings, FIG. 1 schematically illustrates the concept of field recording for this invention, to map the permeable formations that have a direct path of fluid flow between two wells in a hydrocarbon reservoir. The Well 10 is being used as a source well for a downhole seismic source 12. The downhole source 12 is capable of generating a mono-frequency seismic signal in the range of frequencies of 200 Hz to 5,000 Hz and has output range to cover crosswell distances of three to four thousand feet. Such downhole sources are available in the industry and are known in the art.

The downhole source 12 is operated through a conventional wireline using conventional crosswell seismic equipment that includes a source control truck 17. The downhole seismic source operation and its deployment practices are well known in the current art.

The Well 11 is the Receiver Well, in which seismic detectors/receivers are deployed. The receiver array 13 may have as many as 100 independent seismic receiver channels that can be deployed using wireline equipment and recording truck 18, or they could be part of a permanent installation in the Well 11. For this simple illustration, only one receiver well has been shown; in reality, for recording efficiency it is possible that multiple receiver wells will be used for simultaneous recording. The transmission of a predetermined seismic signal from 12 and this signal being received and recorded by 13 is a common practice in crosswell seismic and does not require a lot of explanation. The selection of a discrete seismic mono-frequency signal and adjusting its period of transmission, then transmitting this signal from downhole source 12 in Well 10 and recording it in Well 11 using the downhole receiver array on as many as 100 independent recording channels spaced 5 feet or 10 feet apart vertically to cover the zone of interest in a producing hydrocarbon reservoir is done according to the current practices in the industry, and are a well known art.

In FIG. 1, 14, 15, and 16 are the reservoir formations to be mapped. 14 and 16 are non-permeable and act as seals to the reservoir formation 15, which is porous and permeable. The downhole source 12 transmits a mono-frequency signal of 1,000 Hz for a 500-millisecond duration, with listening time of an additional 500 milliseconds, thus making it a one-second total recording time duration. The transmitted signal frequency should be selected so that its wavelength is equal to or less than the thickness of the formation 15. This mono-frequency signal propagates through the reservoir formations 14, 15, and 16 and is recorded by the receiver array 13 located in Well 11. The recordings are made from each source location in Well 10. The recording sequence is started by locating the source 12 at the lowest depth in Well 10, and source 12 is moved up vertically after each recording at 5-foot or 10-foot intervals, until the whole zone of interest is covered. Since the receiver array is designed to have a large number of receivers for recording efficiency that are spaced at 5-foot or 10-foot intervals, it may not be necessary to move the receiver array in the Well 11.

In FIG. 1, the receivers located in the permeable formation 15 are identified as a, b, c, and the receivers directly below and above them as d, e, and f, g, and h, which are located in the non-permeable part of the reservoir formations. When the source 12 is located in the permeable formation 15, the recordings made by the receiver signals a, b, and c represent the direct seismic signal path through the permeable formation 15, and the analysis of that recorded signal will indicate the presence of the Drag-Wave, which in turn indicates permeability and tortuosity of the rock. Signals recorded by the receivers d, e, and f, g, and h, which are located out side the permeable formation will not be able to support the Drag-Wave, and indicate the boundaries of the permeable rock.

Figure 2:
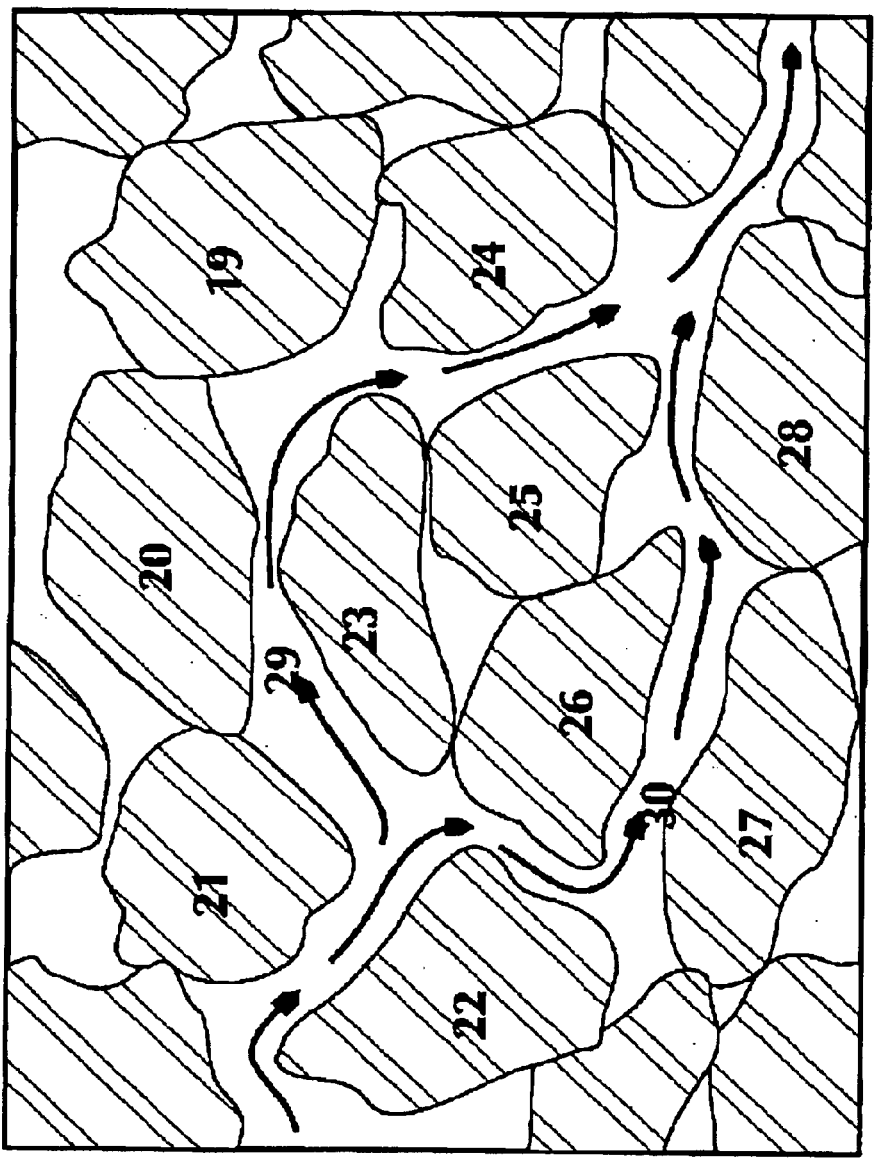
FIG. 2 is a schematic that illustrates the tortuous path of the fluid flow in a permeable rock.

FIG. 2 is a simple schematic in cross section of a permeable rock sample. The grains of a porous and permeable rock that form the matrix or the frame are shown as 19, 20, 21, 22, 23, 24, 25, 26, 27, and 28. The connected pores and the passages for the fluid movement are shown as 29 and 30. The movement path of the fluid is shown by the arrows. The fluid movement does not progress in a straight line but it progresses through complex and sinuous paths. The average and effective distance of the fluid flow path is always greater than the straight-line distance between the two end points.

When a Compressional Wave travels through a porous and permeable rock, the rock matrix is squeezed and a certain amount of energy is transferred from the frame to the fluid in the interconnected pores. A sinusoidal Compressional Wave generates an oscillatory stress in the rock matrix as it propagates through a permeable rock. There is a pressure gradient between the peak and trough of the sinusoidal Compressional Wave. Due to solid/liquid coupling between the matrix and the pore fluids, a Drag-Wave is generated that travels through the fluid in the interconnected pores.

The velocity of the Primary Compressional Wave that travels through the rock matrix is determined by the mineral properties of the grains 19, 20 through 28, and cementation between the grains. The velocity of the Drag-Wave is controlled by the properties of the pore fluid and the tortuous path of interconnections 29 and 30. Determination of the Drag-Wave velocity will enable one to calculate in-situ rock tortuosity and estimate the bulk permeability.

Figure 3:
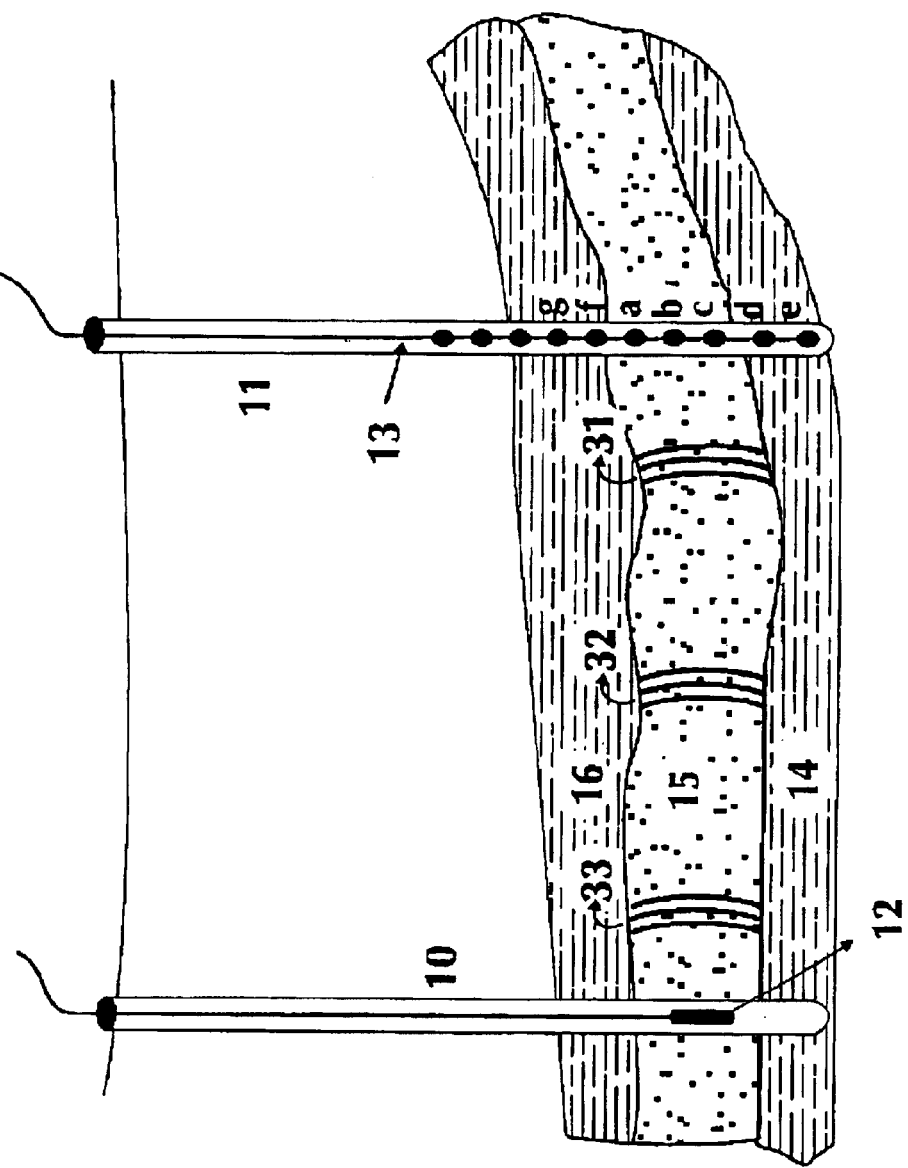
FIG. 3 illustrates the three body waves that can be generated in a permeable reservoir formation.
Figure 5:
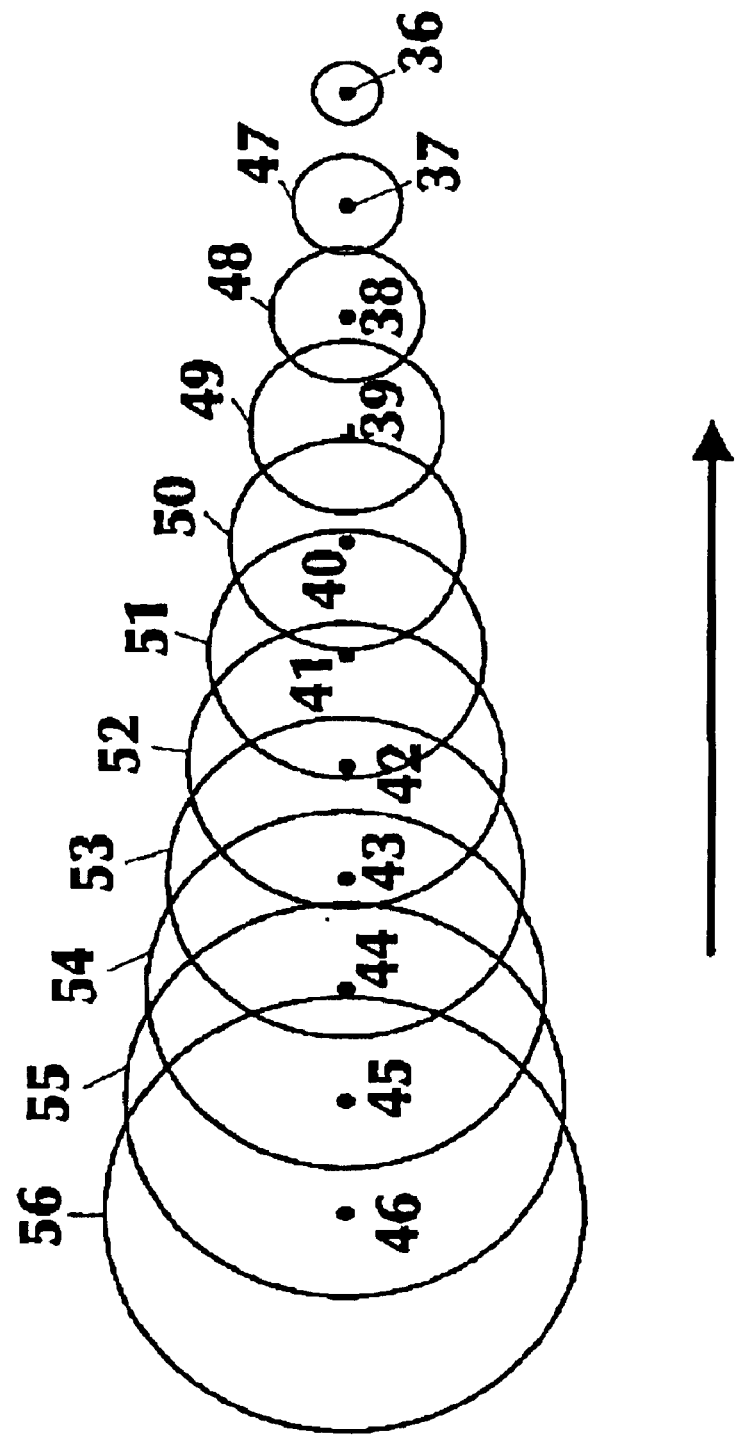
FIG. 5 is a simple illustration of how a Drag-Wave is generated in a permeable formation, when a pressure front propagates through it.

FIG. 3 shows three body waves that travel through a permeable rock formation between two wells, when the formation is excited with the seismic source 12. The Primary Compressional Wave is shown as 31; it travels through the rock matrix and has the fastest propagation velocity. There is a squeezing action as it travels through the rock. The shear wave 32 travels roughly at half the velocity of the Compressional Wave 31 and does not couple with the pore fluids. The Slow-Wave 33 travels at a velocity that is slower than both the compressional velocity of the rock matrix and the compressional velocity of the pore fluid. The Slow-Wave 33 travels through the fluid in the interconnected pores as shown by 29 and 30 in FIG. 2. The Slow-Wave 33 travels at the fluid compressional velocity, but over a longer distance, since the tortuous path along the interconnected pores 29 and 30 is always greater than the straight-line distance between the two end points (the distance between Wells 10 and 11). The Slow-Wave, due to its high attenuation, has been measured in the laboratory, but has not been successfully detected or measured in-situ. The Drag-Wave, shown in FIG. 5, is a form of a Slow-Wave that is generated due to solid/liquid coupling as the Primary Wave propagates through a permeable rock. Since the source mechanism that generates the Drag-Wave is the Primary Wave, it is present wherever the Primary Wave is present. For this reason, Drag-Wave is more suitable for in-situ measurements in reservoir formation where the inter-well distance may be a few thousand feet.

FIG. 2 shows that, due to the physical nature of the permeable rock matrix and the interconnected pores, there is a strong coupling between the rock frame and the pore fluids. The Compressional Wave traveling through the solid grains 19, 20, 21 through 28, squeezes the frame of the rock; this in turn squeezes the fluid in the interconnected pores 29 and 30. A Compressional Wave that travels through the pore fluid is formed whenever a Compressional Wave propagates through a permeable formation 15. In a specific case, when a sinusoidal discrete mono-frequency seismic signal is transmitted by source 12 located in wellbore 10, we have a series of compressional fronts that propagate through formation 15, as shown in FIG. 4.

Figure 4:
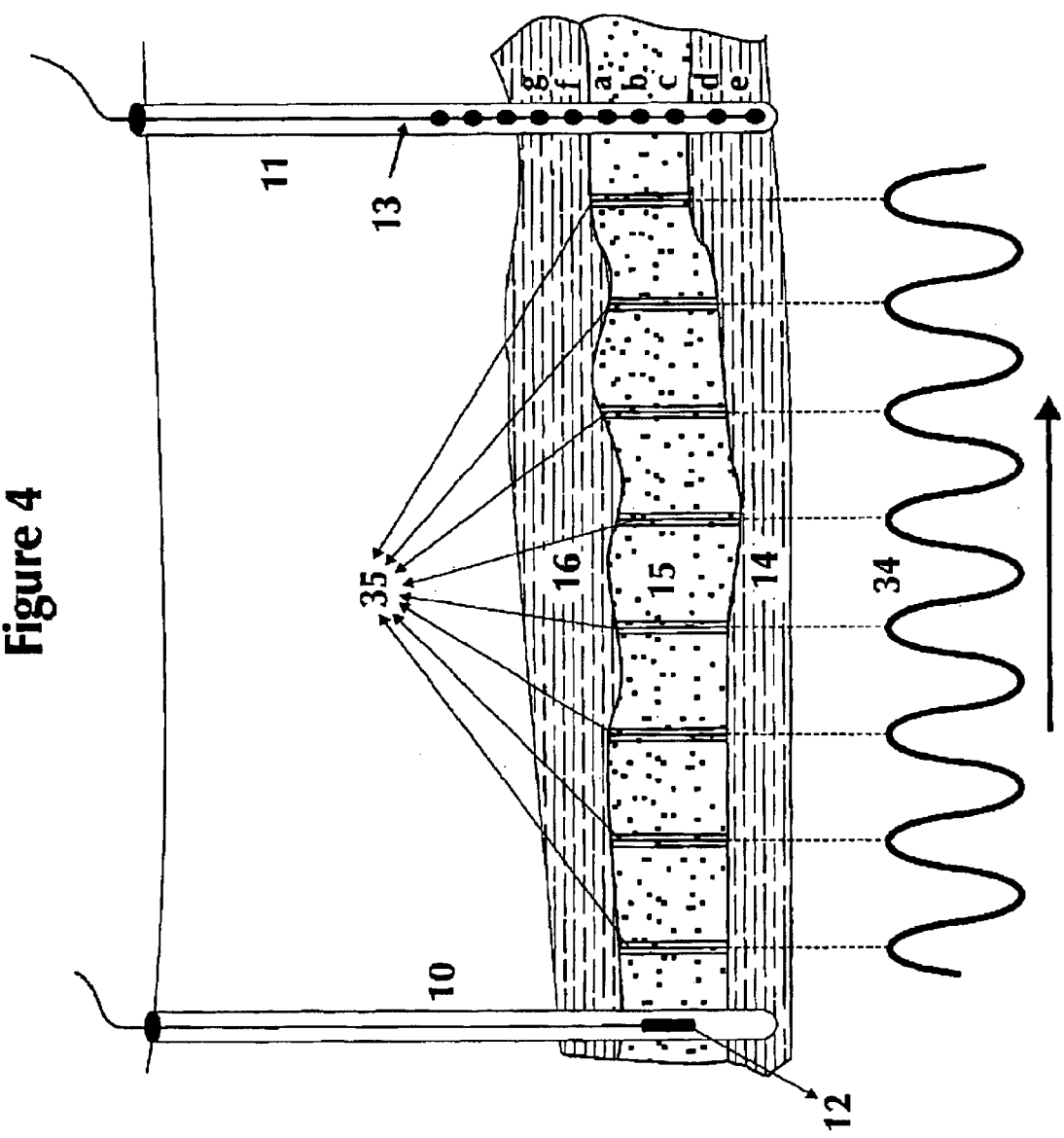
FIG. 4 illustrates a mono-frequency seismic wave being transmitted from the source well and propagating through a reservoir formation and being recorded in the receiver well.

FIG. 4 illustrates the sinusoidal mono-frequency signal transmitted by 12 shown as 34. The positive peaks of 34 represent compression and the negative peaks represent rarefaction. The compressional fronts are shown as 35 in the formation 15, at any instant in time, as they propagate from source Well 10 to receiver Well 11. These compressional fronts are identified as A, B, C through H. The transmitted seismic signal by the source 12 propagates through the formation 15 and is recorded by the receiver array 13 in Well 11.

As the compressional cycles 35 of the sinusoidal seismic wave 34 propagate through the permeable formation 15, there is a strong coupling between the frame or matrix of the formation rock and the pore fluids. Due to this dynamic coupling effect a Drag-Wave is generated. As it propagates through the permeable formation 15, the Compressional Wave acts like a moving source, moving from Well 10 towards Well 11, while the receiver array 13 is stationary. In our application, we are only interested in the wave fronts that are moving towards the receiver Well 11.

Since the receiver array 13 in wellbore 11 is stationary, the compressional fronts 35 are moving towards the receivers with a velocity of the Compressional Wave in the rock matrix. The Drag-Wave that is generated by the Compressional Wave as it propagates through the permeable formation 15 has the velocity of the Compressional Wave in the pore fluid. Since the Drag-Wave can only travel through the fluid in the interconnected pores 29 and 30 in FIG. 2, it travels through a longer and tortuous path and its effective velocity becomes slower than the compressional velocity in the pore fluid. The difference in the velocities of the Compressional Wave traveling through the rock matrix and the Compressional Wave traveling through the pore fluids creates a Doppler Effect, where the source is moving faster than the coupled wave front that is being left behind. In this case, the wave front being left behind is the Drag-Wave.

The concept of the traveling Drag-Wave is illustrated in FIG. 5, where a compressional front that is acting as a source is moving from left to right, at the velocity of the Compressional Wave in the rock matrix. The Drag-Wave moves at a slower velocity determined by the pore fluid and the interconnected path of the pores. The samples of the Drag-Wave fronts that are spaced at one wavelength of the Compressional Wave are displayed. The sample points are shown as 36, 37, through 46. FIG. 5 shows the Drag-Wave fronts when the compressional front is at 36. The Drag-Wave fronts are shown as 47, 48 through 56. The velocity of the Drag-Wave is slower than the compressional velocity in the rock matrix and also slower than the compressional velocity in the pore fluid, so the Drag-Wave lags behind the compressional front that generates it. When the Compressional Wave is a repetitive sinusoidal wave 34 in FIG. 4, the Drag-Wave is being generated continuously by every compressional front of 35, shown as A, B, C through H, as they propagate through formation 15. The Drag-Wave generated by the leading compressional front A will elastically interact with the following compressional fronts B, C through H. This elastic interaction between the two waves traveling in an elastically nonlinear medium is used in this invention to measure the formation permeability and tortuosity.

The permeable rocks are elastically nonlinear to the seismic waves that propagate through them. Due to this elastic nonlinearity, the Drag-Wave, which is generated within the permeable rock, interacts with the externally generated seismic signal transmitted by the source 12 in the wellbore 10 and received in wellbore 11 by the receiver array 13. The nonlinear interaction of the Drag-Wave with the Primary input signal 34, generated by 12, creates the sum and difference frequencies of the two signals along with the harmonics.

Figure 6:
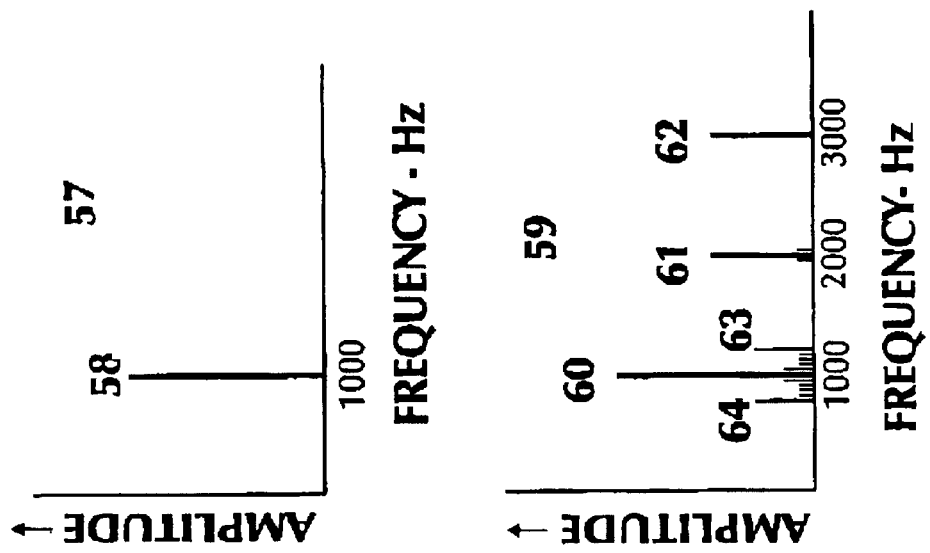
FIG. 6 is a simple illustration of the spectrum of the mono-frequency seismic wave as it propagates through a non-permeable and permeable rock.

FIG. 6 shows the spectrum of the transmitted input signal from the source 12, as 57. The input frequency is 58; in this illustration the frequency is 1,000 Hz. The transmitted signal 34 propagates through the permeable formation 15 and is recorded by 13 in FIG. 4.

When the source 12 and some of the receivers from 13 shown as a, b, and c are located in the permeable formation 15, then the spectrum of the recorded signal is shown as 59 in FIG. 6. In illustration 59, the primary signal is shown as 60, the second and third harmonics as 61 and 62 respectively. The side lobes 63 and 64 are created by the nonlinear interaction of the Primary Compressional Wave frequency 1,000 Hz and the Drag-Wave frequency. In this illustration the side lobe frequencies 63 and 64 are 1,250 Hz and 750 Hz, respectively. Based on the side lobe frequencies, which are generated by the summing and differencing of the Primary frequency and Drag-Wave frequency, the Drag-Wave frequency can be determined to be 250 Hz. 'V', which is the velocity of the Compressional Wave in the formation of interest, can be calculated from the first seismic arrivals of the data recorded by the receivers a, b, and c in Well 11 when the source 12 is in the same permeable formation 15.

We assume that we know the Drag-Wave frequency 'Fdrag' and the Primary Compressional Wave frequency 'Fprim' and the Compressional Wave velocity of the formation rock matrix 'V', in this case 14,000 ft./sec. The Drag-Wave velocity can be calculated:

$$F\text{drag}/F\text{prim}=V\text{drag}/(V-V\text{drag})$$

For this example, the Drag-Wave velocity is calculated to be 2,800 ft./sec., which is slower than both the compressional velocity in the formation 15 and in the pore fluid.

Generally, the velocity of the fluid in the reservoir rock can be determined from the wellbore information, fluid samples, and production information. For this illustration, we have used Vfluid as 4,500 ft./sec. Once we know the Vfluid and Vdrag, then the bulk tortuosity of the permeable formation 15 between wellbores 10 and 11 can be calculated:

$$V\text{drag}=V\text{fluid}/\sqrt{T}$$

where 'T' is the bulk tortuosity of the permeable rock formation 15. For this illustration, tortuosity is 2.58.

Based on the value of tortuosity, the bulk permeability K can be estimated:

$$K=\Phi r^2/8T$$

where 'r' is the average pore radius and 'Φ' is the bulk porosity. The average pore radius can be estimated from the core samples of the rock, and the porosity is usually calculated from the well log information. Permeability is strongly related to the tortuosity of the interconnected pores and the bulk average pore size of the permeable reservoir rock formation.

The relative amplitude of the side lobes 63 and 64 in relation to the amplitude of 60 provides us with a qualitative measure of the rock properties of the reservoir formation between Wells 10 and 11. Additionally, the relative amplitudes of the second and third harmonics 61 and 62, in relation to the amplitude of 60, give us a relative measurement of the nonlinearity of the reservoir formation between Wells 10 and 11. Elastic nonlinearity in the rocks is caused by the defects in the rock frame, porosity, micro-fractures, permeability and pore fluids. This information can be calibrated with the core samples and used for correlation between different well pairs. With time and experience in operating and producing from a reservoir, this qualitative data that relates to the grain and the pore structure of the rock, between different well pairs, can be correlated with the reservoir flow simulation model.

This invention provides us with a method of calculating the bulk tortuosity and then estimating in-situ bulk permeability of the reservoir rock formation between two wells.

As illustrated in FIG. 6, when the spectrum of the recorded signal shows that there are frequency side lobes 63 and 64, in addition to the transmitted frequency 60 and its second and third harmonics 61 and 62, it is an indicator that the transmitter 12 and the receivers a, b, and c are all located in a formation that is connected between wellbore 10 and wellbore 11, and the connected formation 15 is permeable. The art of crosswell seismology that includes 'Crosswell Seismic Tomography', and 'Crosswell Connectivity Mapping' has been in practice over ten years and is well understood. It will be clear to someone familiar with crosswell seismic how to record the necessary data, and how to process it once the main concept of this invention, how to use the nonlinear interaction of the Primary Sinusoidal Wave with the Drag-Wave, which is generated in a permeable rock, is known.

The presence of side lobes 63 and 64 in frequency spectrum of the data recorded between wells 10 and 11, indicates the presence of Drag-Wave. The Drag-Wave can not exist without interconnected pores that contain fluid. Once there is a fluid path, there is permeability, and there is a flow unit in the reservoir.

Description of an Alternative Embodiment

The scope of this Patent is not limited to measuring bulk tortuosity and bulk permeability of the reservoir formation between the two wells. The concept of this Patent is equally applicable when the source and receivers are located in the same well.

Figure 7:
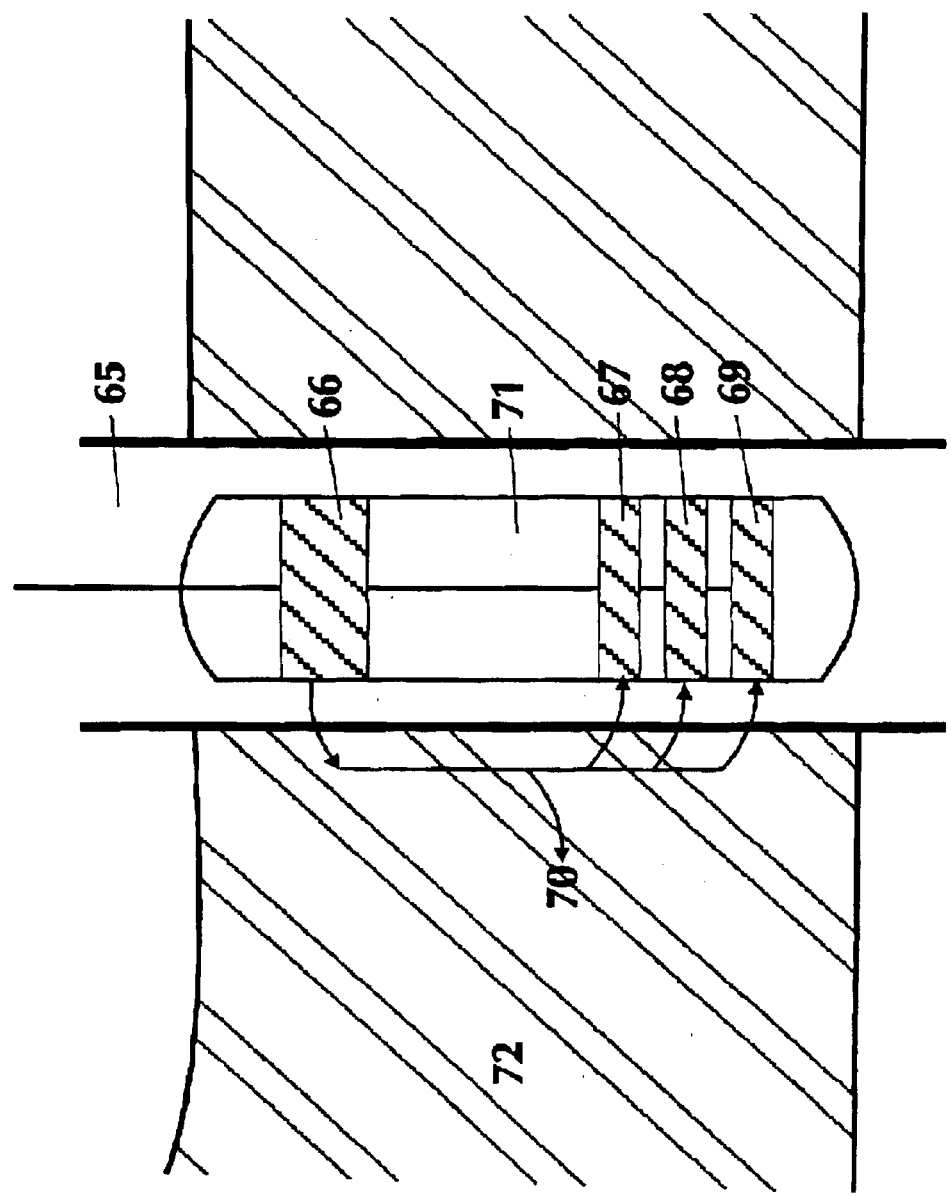
FIG. 7 is a schematic that shows that this invention can be readily applied in a single wellbore to determine the tortuosity and permeability of the reservoir rock in the vicinity of a selected well.

FIG. 7 shows a downhole source 66 in a wellbore 65, and three receivers 67, 68 and 69, located in the same wellbore. The distance between the source 66 and receiver 67 is 10 feet, and the distance between receivers 67, 68 and 69 is 2 feet each. Due to a shorter distance between the source and receivers, the transmitted frequency by the source 66 is higher. In this case, it is selected to be 10,000 Hz.

The mono-frequency seismic signal transmitted by the source 66 is recorded by the three receivers, 67, 68, and 69. The compressional seismic signal 70 travels through the rock formation 72 surrounding the borehole 65. When the formation 72 is permeable, a Drag-Wave is generated. As explained earlier, this Drag-Wave interacts with the Compressional Wave 70, and the summed and differenced frequencies are generated. These new frequencies are generated due to the elastic nonlinearity of the permeable formation 72. These summed and differenced frequencies can be measured in the frequency domain by the side lobes of the recorded signal spectrum. As described earlier in the 'Summary of the Invention', the Drag-Wave frequency 'Fdrag' can be determined.

The first arrivals of the signal transmitted by 66 and recorded by 67, 68, and 69 enable us to calculate the compressional velocity 'V' of the formation 72 surrounding the wellbore. The art of calculating formation velocity from first arrival times is well known in the industry, and is an accepted art. The equation:

$$Fdrag/F = Vdrag/(V-Vdrag)$$

gives us the Drag-Wave velocity. From this, as described earlier, the 'tortuosity' of the formation 72 can be determined. Knowing the tortuosity, the permeability of rocks surrounding the wellbore can be estimated.

The source 66 and receivers 67, 68 and 69, could be housed in a sonde that could be deployed using standard wire line equipment. The art of recording 'Sonic' and other well-logs is well known in the industry, and is an everyday practice throughout the world, and need not be explained in detail. The main point of this invention is to determine the in-situ 'tortuosity' of the reservoir rocks, by using a source and receivers in the same well, and from that derive the bulk permeability of the rocks in the vicinity of the said wellbore.

References Cited

Johnson, P. A., Rasolofosaon, P. N. J.; Manifestation of Nonlinear Elasticity in Rock: Convincing Evidence Over Large Frequency and Strain Intervals from Laboratory Studies;
Journal: Nonlinear Processes in Geophysics.
Johnson, P. A., Shankland, T. J.; Nonlinear Generation of Elastic Waves in Crystalline Rock;
Journal: Journal of Geophysical Research.
Meegan, G. D., Johnson, P. A.; Observation of Nonlinear Elastic Wave Behaviour in Sandstone;
Journal: Journal Acoustic Society of America.
Biot, M. A., 1956, Theory of propagation of elastic waves in a fluid saturated porous solid:
Journal Acoustic Society of America.
Scheidegger, A. E. 1960, Physics of flow through porous media: University of Toronto.
Klimentos, T., McCann, C., 1988, Why is the Biot Slow Compressional Wave not observed in real rocks.
Geophysics 53, 1605.
Johnson, P. A., McCall, K. R.; Observations and Implications of Nonlinear Elastic Wave Response in Rock;
Journal: Geophysical Research letters.
U.S. Patent Document
845987 Jan. 2001 Khan 367/32.

What is claimed is:

1. A new method for determining the in-situ Slow-wave or Drag-wave velocity, both these waves representing the same phenomenon, of permeable reservoir rock formations which are continuous between two wellbores, and from that determination, using the existing known mathematical relationship to calculate the bulk tortuosity of the interconnected pores of reservoir rock, and estimating the bulk permeability of a reservoir formation between seismic transmitters and seismic receivers, the method comprising:

Transmit a mono-frequency signal generated by a seismic transmitter or seismic transmitters in a wellbore and received by a seismic receiver or seismic receivers in another or the same wellbore, spectrally analyzing said received signals, determining the presence of the Drag Wave by determining the presence of the frequency side lobes of the Primary seismic wave, of a selected discrete frequency, the frequency side lobes in the said spectrum of the received signals being created by the nonlinear elastic interaction of the Primary mono-frequency seismic wave with the Drag Wave, the Drag Wave being generated through solid/liquid coupling as the Primary Compressional Wave propagates through a permeable reservoir formation between two wells, and the said formation has fluid-filled interconnected pores.

2. The method of claim 1 further comprising analyzing the spectral content of the received signal.

3. The method of claim 2 further comprising identifying the side lobes of the mono-frequency signal that was transmitted.

4. The method of claim 3, wherein the frequency of the side lobes represents (F−Fdrag) and (F+Fdrag), where F is the mono-frequency and Fdrag is the frequency of the 'Drag Wave'; these side lobes are generated due to the elastic nonlinear interaction between the mono-frequency wave traveling through the rock matrix and the 'Drag Wave' being generated due to the coupling between the matrix and pore fluids.

5. The method of claim 4, further comprising the velocity of the 'Drag Wave' Vdrag by using the Doppler Effect in which Fdrag/F=Vdrag/(V−Vdrag); where Fdrag is the frequency of the 'Drag Wave', F is the mono-frequency, Vdrag is the velocity of the 'Drag Wave' and V is the velocity of the mono-frequency signal.

6. The method of any one of claims 1–5 specifically used to determine in-situ bulk tortuosity of the interconnected pores of reservoir rock, and estimating the bulk permeability of a reservoir formation connected between two wells.

7. The method of any one of claims 1–5 specifically used to determine in-situ bulk tortuosity of the interconnected pores of reservoir rock, and estimating the bulk permeability of a reservoir formation in a well between two depth points in that well.

* * * * *